United States Patent
Nishida et al.

(10) Patent No.: US 6,765,034 B2
(45) Date of Patent: Jul. 20, 2004

(54) FLAME-RESISTANT AND SOUND- AND VIBRATION-INSULATING MEMBER FOR VEHICLES, AND PROCESS OF MANUFACTURING THE SAME

(75) Inventors: Kiyomi Nishida, Inuyama (JP); Toyofumi Shimizu, Nagoya (JP); Takayuki Shimizu, Komaki (JP); Eiji Motomura, Takatsuki (JP); Takuya Matsumoto, Suita (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/198,014

(22) Filed: Jul. 18, 2002

(65) Prior Publication Data

US 2003/0096884 A1 May 22, 2003

(30) Foreign Application Priority Data

Sep. 27, 2001 (JP) ........................................ 2001-296056

(51) Int. Cl.⁷ ............................................... C08G 18/28
(52) U.S. Cl. ......................... 521/170; 521/163; 521/174
(58) Field of Search ................................ 521/163, 170, 521/174

(56) References Cited

U.S. PATENT DOCUMENTS

| | | |
|---|---|---|
| 2,853,473 A | 9/1958 | Campbell et al. |
| 4,072,712 A | 2/1978 | Meisert et al. |
| 5,338,820 A | 8/1994 | Harrison et al. |
| 5,730,909 A | 3/1998 | Smiecinski et al. |
| 5,739,173 A | 4/1998 | Lutter et al. |
| 5,877,227 A | 3/1999 | Murty |
| 6,077,456 A | 6/2000 | Narayan |
| 6,136,879 A * | 10/2000 | Nishida et al. ............. 521/174 |
| 6,237,717 B1 | 5/2001 | Osanai et al. |

FOREIGN PATENT DOCUMENTS

| | | |
|---|---|---|
| GB | 1 351 954 | 5/1974 |
| GB | 1 356 851 | 6/1974 |
| JP | 52-27703 | 3/1977 |
| JP | 57-22051 | 5/1982 |
| JP | 59-7545 | 3/1984 |
| JP | 61-50965 | 11/1986 |
| JP | 5-178812 | 7/1993 |
| JP | 7-233236 | 9/1995 |
| JP | 10-81142 | 3/1998 |
| WO | WO 00/46283 | 8/2000 |

* cited by examiner

Primary Examiner—John M. Cooney, Jr.
(74) Attorney, Agent, or Firm—Burr & Brown

(57) ABSTRACT

A flame-resistant and sound- and vibration-insulating member for a vehicle, which is a soft polyurethane foam formed by a reaction between an organic polyisocyanate component and a polyol component, wherein the organic polyisocyanate component includes as a major component a monomeric MDI and further includes a reaction product containing carbodiimide and/or uretone imine groups, the monomeric MDI containing 29–33% of NCO and including 1–45% by weight of 2,4'-diphenylmethane diisocyanate, while the polyol component includes at least 50% by weight of polyol having 2–8 functional groups and a molecular weight of 1000–10000, and wherein the soft polyurethane foam has a density of 40–150 kg/m³, a 50% compressive load of $(5-60) \times 10^{-2}$ N/mm², a tensile strength of at least 120 kPa and an elongation of at least 50%, and exhibits flame resistance according to FMVSS-302. A process of manufacturing the flame-resistant and sound- and vibration-insulating member is also disclosed.

7 Claims, No Drawings

US 6,765,034 B2

FLAME-RESISTANT AND SOUND- AND VIBRATION-INSULATING MEMBER FOR VEHICLES, AND PROCESS OF MANUFACTURING THE SAME

This application is based on Japanese Patent Application No. 2001-296056 filed on Sep. 27, 2001, the contents of which are incorporated hereinto by reference.

BACKGROUND OF THE INVENTION

1. Field of the Invention

The present invention relates to a flame-resistant and sound- and vibration-insulating member for vehicles, and a process of manufacturing the same, and more particularly, to a sound- and vibration-insulating member consisting of a soft polyurethane foam which has not only excellent heat resistance, but also high degrees of fire or flame resistance or retardancy and sound or noise absorbing property, and a process suitable for manufacturing such a sound- and vibration-insulating member.

2. Discussion of Related Art

Conventionally, vehicles such as automotive vehicles use various sound-insulating members for isolating or insulating noises to be transmitted to the outside of the vehicle body or to the inside of the vehicle compartments. In the engine room of the vehicle, for example, an engine cover, side covers, an oil-pan cover and an under cover are disposed around the vehicle engine, to reduce the amount of the noise to be transmitted from the engine, which is a source of the noise. Those covers are rigid members such as metallic sheets which are provided with foamed bodies such as foamed rubber or urethane fixed thereto, as disclosed in FIG. 1 of U.S. Pat. No. 6,237,717 B1. In the vicinity of the engine body of the vehicle, there are also disposed various devices and components, and gaps or spaces are inevitably left between the engine body and those devices and components. In operation of the engine, standing waves are generated in those gaps, and the noises generated by the engine are undesirably boosted. To attenuate or suppress the standing waves for thereby reducing the noises to be transmitted from the engine, JP-Y2-59-7545 proposes to fill the above-indicated gaps or spaces with noise insulators in the form of foamed bodies such as foamed rubber or urethane members, such that the noise insulators exist as spacers or fillers in the spaces between the engine body and the surrounding devices and components.

The foamed rubber or urethane material of such sound or noise insulators that are disposed in the vicinity of the engine body is required to exhibit high degrees of not only heat deterioration resistance but also flame or fire resistance. Although EPDM foamed bodies conventionally used as the foamed rubber members have a high resistance to heat deterioration, they suffer from a problem of insufficient flame resistance,or retardancy. On the other hand, foamed bodies of epichlorohydrin rubber also used as another type of foamed rubber members have a high degree of flame resistance, but suffer from insufficiency in the heat deterioration resistance.

Examples of the foamed urethane members used alternatively to the foamed rubber members are foamed polyurethane members foamed with asphalt such that the polyurethane foam is impregnated with the asphalt, as disclosed in JP-B2-57-22051 and JP-B2-61-50965. Described in detail, the asphalt-impregnated polyurethane foam is formed by filling a mold with a composition consisting of polyol, polyisocyanate, a foaming agent, an amine catalyst, a fire or flame retarder or retardant and asphalt, and foaming the composition into the asphalt-impregnated polyurethane foam. The thus formed asphalt-impregnated polyurethane foam is relatively economical to manufacture, and has a relatively high degree of heat resistance, but suffers from a potential problem of insufficiency of flame or fire resistance or retardancy. While the flame resistance of the asphalt-impregnated polyurethane foam can be improved by increasing the content of the flame retardant of the above-indicated composition, an increase in the content of the flame retardant inevitably results in an increase of cost of manufacture of the polyurethane foam, and the heat deterioration resistance and other properties of the foam are undesirably lowered. Accordingly, the asphalt-impregnated polyurethane foam having an increased content of the flame retardant is not acceptable.

JP-A-7-233236 discloses a noise insulating urethane foam which uses a styrene polymer as a polyol component and which includes a flame or fire retardant. The use of the styrene polymer together with the flame retardant material in an attempt to enable the polyurethane foam to exhibit high degrees of not only flame resistance but also heat deterioration resistance makes it difficult to manufacture the polyurethane foam at a low cost. Further, the heat deterioration resistance is satisfactory at 120° C. or lower, namely, the flame retardant contained in the foam tends to scatter at a temperature exceeding 120° C., undesirably resulting in a loss of flame resistance and/or reduction of the heat deterioration resistance of the polyurethane foam.

Further, JP-A-10-81142 discloses a vehicle vibration- and noise-insulating member which has excellent vibration and noise insulating properties and excellent waterproofing property. This vibration- and noise-insulating member is a foamed body (polyurethane foam) formed by a reaction between a polyolefin polyol having a skeleton of a saturated hydrocarbon resin as a polyol component, and an organic polyisocyanate component, in the presence of a surface active agent having a skeleton of fatty ester including a hydrophilic group. However, the above-indicated publication JP-A-10-81142 does not disclose any means for giving the polyurethane foam excellent flame resistance and heat deterioration resistance.

SUMMARY OF THE INVENTION

The present invention was made in view of the background art discussed above. It is therefore a first object of the present invention to provide a flame-resistant and sound- and vibration-insulating member for a vehicle, which exhibits high degrees of not only flame resistance but also heat deterioration resistance and which is improved in its sound absorbing property and economical to manufacture. A second object of this invention is to provide a process suitable for manufacturing such a flame-resistant and sound- and vibration-insulating member having excellent properties.

The first object indicated above may be achieved according to a first aspect of the present invention, which provides a flame-resistant and sound- and vibration-insulating member for a vehicle, comprising a soft polyurethane foam formed by a reaction between an organic polyisocyanate component and a polyol component, wherein the organic polyisocyanate component includes as a major component thereof a monomeric MDI which includes diphenylmethane diisocyanate and further includes a reaction product containing carbodiimide and/or uretone imine groups, said reaction product being obtained by carbodiimidizing isocyanate groups of diphenylmethane diisocyanate, said monomeric MDI containing 29–33% of NCO and including 1–45% by weight of 2, 4'-diphenylmethane diisocyanate in the form of a monomer and/or a carbodiimidization product, while the polyol component includes at least 50% by weight of polyol having 2–8 functional groups and a molecular weight of 1000–10000, and wherein the soft polyurethane foam has a density of 40–150kg/m$^3$, a 50% compressive load of $(5-60) \times 10^{-2}$N/mm$^2$, a tensile strength of at least 120 kPa and an elongation of at least 50%, and exhibits flame resistance under a flammability test according to FMVSS-302 (Federal Motor Vehicle Safety Standards, USA).

In the flame-resistant and sound- and vibration-insulating member of the present invention described above, the polyurethane foam which constitutes this material is characterized in that the polyurethane foam is formed by a reaction between the specific organic polyisocyanate component described above and the specific polyol component also described above. In this reaction, the activity and cross-linking property of the organic polyisocyanate component are effectively combined and balanced with those of the polyol component, making it possible to obtain a soft polyurethane foam which exhibits excellent physical properties before and after a heat deterioration test, and high degrees of fire or flame resistance or retardancy and formability.

In particular, the present invention uses as the organic polyisocyanate component a MDI-based polyisocyanate whose major component consists of diphenylmethane diisocyanate (MDI). The MDI-based polyisocyanate is a monomeric MDI including a reaction product containing at least one of carbodiimide group and uretone imine group. The reaction product is obtained by carbodiimidizing isocyanate groups of diphenylmethane diisocyanate, rather than a conventionally used polymeric MDI. The use of this monomeric MDI permits an effective improvement in the heat deterioration resistance of the obtained soft polyurethane foam, and effectively gives the foam a high degree of fire or flame resistance, without the addition of any conventionally used flame or fire retardant, so that the foam when exposed to a flame is melted down due to heat, and therefore prevents propagation of the flame.

Thus, the present invention has eliminated a need of including any flame retardant into the foam for the purpose of giving a flame resistance to the flame-resistant and sound- and vibration-insulating member for the vehicle. Accordingly, the present flame-resistant and sound- and vibration-insulating material is free of any of the various problems which would be caused by the use of a flame retardant in a large amount as experienced in the prior art, and which include a problem of an increase in the cost of manufacture of the foam.

According to one preferred form of the flame-resistant and sound- and vibration-insulating material of the present invention, a content of NCO in the monomeric MDI is held within a range of 30.5–32.5%, so that the present material exhibits the above-indicated advantages with increased stability.

According to another preferred form of the flame-resistant and sound- and vibration-insulating material of the invention, each of the tensile strength and the elongation of the soft polyurethane foam after a heat aging or deterioration test for 50 hours at 160° C. is at least 50% of those before the heat deterioration test.

According to a further preferred form of the material of the present invention, the organic polyisocyanate component does not include a polymeric MDI consisting of a crude MDI having at least three benzene rings in a molecule, or includes the polymeric MDI such that a content of the polymeric MDI with respect to a sum of the monomeric MDI and the polymeric MDI is not larger than 5% by weight. According to this form of the invention, the object indicated above may be more advantageously achieved.

The second object indicated above may be achieved according to a second aspect of this invention, which provides a process of manufacturing a flame-resistant and sound- and vibration-insulating member for a vehicle, comprising a soft polyurethane foam formed by a reaction between an organic polyisocyanate component and a polyol component, the process comprising the steps of preparing the organic polyisocyanate component such that the organic polyisocyanate component includes as a major component thereof a monomeric MDI which includes diphenylmethane diisocyanate and further includes a reaction product containing carbodiimide and/or uretone imine groups, the reaction product being obtained by carbodiimidizing isocyanate groups of diphenylmethane diisocyanate, the monomeric MDI containing 29–33% of NCO and including 1–45% by weight of 2,4'-diphenylmethane diisocyanate in the form of a monomer and/or a carbodiimidization product thereof, preparing the polyol component such that the polyol component includes at least 50% by weight of polyol having 2–8 functional groups and a molecular weight of 1000–10000; and causing a reaction between the organic polyisocyanate component and the polyol component, to form the soft polyurethane foam, such that a NCO/OH index is held within a range of 0.6–1.2.

The method according to the second aspect of this invention described above permits easy and economical manufacture of the flame-resistant and sound- and vibration-insulating member for the vehicle, with a high degree of formability and so as to give the material excellent properties as described above with respect to the first aspect of the invention.

According to one preferred form of the second aspect of the present invention, the reaction between the polyisocyanate component and the polyol component takes place in the presence of a foaming agent, so that the reaction to form polyurethane and foaming of the polyurethane take place concurrently, permitting efficient manufacture of the desired flame-resistant and sound- and vibration-insulating material with excellent properties.

DETAILED DESCRIPTION OF THE INVENTION

One of the two components which react with each other to form the soft polyurethane foam which gives the desired flame-resistant and sound- and vibration-insulating material according to the present invention is the organic polyisocyanate component including as its major component a monomeric MDI which includes diphenylmethane diisocyanate (MDI) and further includes a reaction product containing carbodiimide and/or uretone imine groups, the reaction product being obtained by carbodiimidizing isocyanate groups of diphenylmethane diisocyanate. The monomeric MDI containing 29–33% of NCO, and includes 1–45% by weight of 2, 4'-diphenylmethane diisocyanate in the form of a monomer and/or a carbodiimidization product thereof.

The MDI includes not only 4, 4'-MDI, but also 2, 4'-MDI and any other isomers. The carbodiimide product (modified product) of diphenylmethane diisocyanate is obtained by a carbodiimidization reaction in which NCO groups in respective two molecules of the MDI are subject to mutual condensation, while the uretone imine product (modified product) of diphenylmethane diisocyanate is obtained by a uretone-iminization reaction in which one molecule of the MDI is added to the obtained carbodiimide product. Namely, when the carbodiimide product of MDI is obtained, a uretone imine product is also produced by a second-order reaction in the form of a chemical equilibrium reaction. In this sense, the expression "a reaction product containing carbodiimide and/or uretone imine groups of diphenylmethane diisocyanate" is used to cover the products obtained by the second-order reaction. It is generally considered that only the uretone imine product is obtained by the second-order reaction following the carbodiimidization reaction to obtain the carbodiimide product.

The carbodiimide product and uretone imine product of MDI may be easily obtained by using a suitable catalyst for reaction with a MDI which consists of a single component or a plurality of components including an isomer, in a known manner as disclosed in JP-A-52-27703, JP-A-5-178812 and U.S. Pat. No. 2,853,473. For instance, organic phosphorus containing a compound such as a phospholine or a phospholidine is used as the catalyst for reaction with the selected MDI for about 1–4 hours at 200–220° C., so as to induce the carbodiimidization reaction and the uretone-iminization reaction.

In the present invention, the monomeric MDI which is a major component of the organic polyisocyanate is constituted by a MDI in the form of a monomer, a MDI in the form of a dimer and at least one of carbodiimide and uretone imine products in the form of a trimer. This monomeric MDI includes 29–33% by weight of NCO. If the content of NCO in the monomeric MDI were smaller than 29%, the concentration of the carbodiimide/uretone imine product or products in the resin (polyurethane foam) would be excessively high, causing an excessive cross-linking in the resin and undesirably lowering the flame or fire resistance of the foam. If the content of NCO were larger than 33%, the concentration of the carbodiimide/uretone imine product or products in the resin would be excessively low, causing insufficiency of cross-linking in the resin and undesirably lowering the stability of the foam, leading to a risk of collapsing of the foam during formation thereof. Preferably, the content of NCO is held within a range of 30.5–32.5%. To hold the content of NCO in the range of 30.5–32.5%, at least one of the carbodiimide and uretone imine products is added to the diphenylmethane diisocyanate (MDI). Generally, the content of the carbodiimide product and/or uretone imine product is held within a range of about 3–30% by weight.

According to the present invention, the monomeric MDI is required to include 1–45% by weight of 2, 4'-MDI in the form of a monomer, that is, as one of the components of the MDI, and in the form of the carbodiimide product and/or the uretone imine product, so that the solidifying point of the monomeric MDI is lowered, and so that the foaming reaction takes place with a high degree of stability to obtain the desired polyurethane foam. If the content of the 2, 4'-MDI in the monomeric MDI were larger than 45% by weight, there would arise various problems such as an increase in the required time for curing the foam, resulting insufficiency of the formed foam and poor formability of the foamed product. On the other hand, the monomeric MDI whose content of the 2, 4'-MDI is smaller than 1% by weight is difficult to be realized from the standpoint of fabrication.

The known MDI-based soft foam to be obtained by using polyisocyanate whose major component is MDI is formed by a foaming reaction utilizing the cross-linking characteristics of a polymeric MDI which is a crude MDI having three or more benzene rings (having three or more NCO groups) in a molecule of the polyisocyanate component, in addition to the activity of the polyol component. On the other hand, the present invention is characterized by the replacement of such polymeric MDI by at least one MDI modification in the form of at least one of the carbodiimide and uretone imine products of MDI. For instance, the carbodiimide-modified MDI is provided with a uretone imine linkage (uretone imine modification) having three NCO groups, under chemical equilibrium. As a result, the carbodiimide-modified MDI has very moderate cross-linking characteristics. Further, a carbodiimide linkage of the carbodiimide-modified MDI has a high thermal decomposition point, and is effective to give the foam a high degree of heat deterioration resistance. The foam obtained by cross-linking of the known polymeric MDI tends to be excessively hardened and have deteriorated physical properties after a heat deterioration test, presumably due to secondary cross-linking at a high temperature in the presence of the polymeric MDI.

The foam obtained according to the present invention using the organic polyisocyanate which includes as a major component thereof the monomeric MDI containing the carbodiimide/uretone imine product or products of MDI exhibits flame resistance before and after the heat deterioration test. The term "flame resistance" is interpreted to mean flame resistance under the flammability test according to FMVSS (Federal Motor Vehicle Safety Standards, USA)-302. That is, the foam when exposed to a flame is melted down due to heat, and therefore prevents propagation of the flame, so that the foam is not inflammable. Namely, the foam obtained according to the present invention is not continuously flammable, since the rate of melting of the foam is higher than the rate of propagation of the flame.

On the other hand, a foam obtained by a reaction to form polyurethane with excessive cross-linking in a MDI system including a relatively large content of polymeric MDI is not melted upon exposure to a flame in the flammability test, causing propagation of the flame, so that the foam is continuously flammable. To the contrary, the present invention uses the monomeric MDI which includes the carbodiimide/uretone imine product or products of MDI and permits the cross-linking reaction of the foam to take place in a very moderate way. This monomeric MDI is considered to prevent a further progress of the cross-linking in the heat deterioration test so that the foam is relatively easily melted down due to heat of the flame, preventing propagation of the flame. If the content of the carbodiimide/uretone imine product or products in the monomeric MDI is increased to such an extent that causes the content of NCO in the monomeric MDI to be smaller than the lower limit of 29%, however, the obtained foam has an excessively large degree of cross-linking, which causes the foam to be comparatively easily flammable.

In the present invention, the monomeric MDI having the composition as described above is used as a major component of the organic polyisocyanate component which reacts with the polyol component. Accordingly, the organic polyisocyanate component may include, in addition to the monomeric MDI, not larger than 50% by weight of other polyisocyanate compounds, as needed, provided the addition of the other polyisocyanate compounds does not have adverse influences on the function or effect of the carbodiimide/uretone imine product or products. Typical examples of such other polyisocyanate compounds include isocyanate-terminal prepolymers which are formed by a reaction between at least one of compounds of the above-indicated monomeric MDI, and suitable active hydrogen compounds.

To improve the formability and other characteristics of the obtained foam, the other polyisocyanate compounds may be selected from among organic isocyanates such as tolylene diisocyanate (TDI), isopholone diisocyanate (IPDI) and xylene diisocyanates, and modifications thereof.

In the present invention wherein at least one of the carbodiimide and uretone imine products of MDI is used in place of the conventionally used polymeric MDI, the use of such polymeric MDI in combination with the monomeric MDI is not required in principle, but is possible as long as the object of the invention can be substantially achieved. That is, the polymeric MDI may be included in the organic polyisocyanate component such that the content of the polymeric MDI with respect to a sum of the monomeric MDI and the polymeric MDI does not exceed 5% by weight.

On the other hand, the polyol component which reacts with the above-described organic polyisocyanate to form the desired polyurethane foam includes at least 50% by weight of polyol which has 2–8 functional groups and a molecular weight of 1000–10000. This polyol component is highly reactive with the organic polyisocyanate to form the flame resistant soft polyurethane foam. If the number of the functional groups of the polyol were smaller than 2, a chain reaction of the polyol with the organic polyisocyanate component would be incomplete, and the molecular weight of the obtained foam would be undesirably lowered, making it impossible to form the desired foam. If the number of the functional groups were larger than 8, the elongation of the obtained form would be lowered to an extremely large extent. If the molecular weight of the polyol were smaller than 1000, the obtained foam would be undesirably hardened, and would not function as a soft polyurethane foam with a sufficiently high degree of elasticity. If the molecular weight of the polyol were larger than 10000, the viscosity of the polyol would be undesirably increased, making it difficult to react with the organic polyisocyanate component to form the desired foam. The polyol component including at least 50% by weight of polyol whose number of functional groups and molecular weight are held within the respective ranges as specified above is capable of effectively reacting with the organic polyisocyanate component, to form the desired polyurethane foam.

The polyol whose number of functional groups and molecular weight are held within the respective specified ranges may be selected from known polyols. For instance, the polyol used according to the invention may be one or a combination of polyols selected from among: polyvalent hydroxy compounds; polyether polyols; polyester polyols; polymer polyols; polyether ester polyols; polyether polyamines; polyester polyamines; alkylene polyols; urea-dispersed polyols; melamine-modified polyols; polycarbonate polyols; acrylic polyols; polybutadiene polyols; and phenol-modified polyols.

The flame-resistant sound- and vibration-insulating member for a vehicle according to the present invention is a soft polyurethane foam formed by a foaming reaction between the specific organic polyisocyanate and the specific polyol, which have been described above. The formed polyurethane foam is required to have a density of 40–150kg/m$^3$, a 50% compressive load of $(5-60)\times 10^{-2}$N/mm$^2$, a tensile strength of at least 120 kPa and an elongation of at least 50%, so that the polyurethane foam can be effectively used as the sound- and vibration-insulating material for the vehicle. The 50% compressive load is a compressive load per unit surface area upon compression of the foam by 50%, according to ASTM-D-3574.

If the density of the soft polyurethane foam were lower than 40kg/m$^3$, the foam would not have desired properties, in particular, would not have a sufficient strength, and could not be suitably used as the flame-resistant and sound- and vibration-insulating material for the vehicle. If the density were higher than 150 kg/m$^3$, the foamed product would have an increased weight, and would be disadvantageous in its application to a vehicle where the vehicle is required to have a reduced weight. The 50% compressive load indirectly represents the hardness of the polyurethane foam. If the 50% compressive load were smaller than $5\times 10^{-2}$N/mm$^2$, the polyurethane foam when used as a filler for filling a gap or space could not be easily disposed so as to fill the gap or space, and would be easily removed from the gap. If the 50% compressive load were larger than $60\times 10^{-2}$N/mm$^2$, the polyurethane foam would be too hard to be disposed so as to fill the gap or space with a sufficiently high sound- or noise-insulating effect. If the tensile strength or elongation were excessively low or small, the foamed product would have a risk of being broken when the product is installed in place, or would have a shorter service life than that of the vehicle on which the product is installed. In this respect, the polyurethane foam is required to have the tensile strength and elongation which are larger or higher than the lower limits indicated above.

Further, the polyurethane foam according to the present invention is given not only a high degree of formability but also inflammability, owing to a good balance between the activity and cross-linking property of the specific organic polyisocyanate component and those of the specific polyol component. As described above, the term "flame resistance" is interpreted to mean that the foam when exposed to a flame in the flammability test according to FMVSS-302 is melted down due to heat, and prevents propagation of the flame so that the foam is not continuously flammable.

The tensile strength and elongation of the polyurethane foam after a heat aging or deterioration test for 50 hours at 160° C. are preferably at least 50% of those before the heat deterioration test. The polyurethane foam whose tensile strength and elongation are kept sufficiently large or high even after the heat deterioration test can serve as the sound- and vibration-insulating material for a vehicle for a prolonged period of time.

To form the flame-resistant and sound- and vibration-insulating member for a vehicle according to the present invention, the specific organic polyisocyanate component and the specific polyol component are introduced into a suitable mold, to effect a foaming reaction between those components, for thereby forming a polyurethane foam having the desired shape, which serves as the flame-resistant and sound- and vibration-insulating member. It will be understood that various known additives may be added to the organic polyisocyanate component and polyol component, as needed. Such additives include a catalyst, a cross-linking agent, a foaming agent, a foam stabilizer, a chain transfer agent and a viscosity reducing agent.

As the catalyst, known amine-based catalysts and organic-metal-based catalysts may be used. Representative examples of the amine-based catalysts include: bis (dimethylaminoethyl)eter; pentamethyldiethylenetriamine; N, N-dimethylcyclohexylamine; N, N-dimethylethanolamine; N, N, N', N'-tetramethylhexamethylenediamine; N, N, N', N'-tetramethylpropylenediamine; N, N, N', N-tetramethylethylenediamine; triethylenediamine; N-methyl-N'-(dimethylamino)ethylpiperazine; N-methylmonopholine; and triethylamine. Representative examples of the organometallic catalyst include tin laurate and tin octanoate.

Water may be preferably used as the foaming agent, as used in the art. However, other foaming agents such as methylene chloride, flon and $CO_2$ gas may be used. The amount of the foaming agent is empirically determined, as in the manufacture of known polyurethane foams. Where water is used as the foaming agent, about 1–6 parts by weight of water is generally used per 100 parts by weight of the polyol component.

The cross-linking agent is selected from known cross-linking agents having a comparatively small molecular weight, depending upon the desired hardness of the foam to be obtained. Representative examples of the cross-linking agent that may be used include: diols; triols; polyvalent amines; compounds of a diol, triol or polyvalent amine and ethylene oxide or propylene oxide; triethanolamines; and diethanolamines. Representative examples of the foaming aid that may be used are silicone-based foaming stabilizer generally used for a polyurethane foam, such as "SRX-274C" available from Toray Dow Corning Corporation, Japan, "L-05390", "SZ1313" available from Nippon Unicar Co., Ltd., Japan, and "B-4113" available from Goldschmidt, Germany.

Any materials other than the components indicated above may be added, as needed, depending upon the desired properties of the foam to be obtained, without departing from the object of the present invention. Such other materials include a flame or fire retardant, a filler, an anti-static agent, a coloring agent and a stabilizer.

To manufacture the desired polyurethane foam, a resin premix (premix polyol) is initially prepared by adding appropriate amounts of a foaming agent (e.g., water), a catalyst, a foaming aid and other aids to the specific polyol component described above. This resin premix is mixed with the specific organic polyisocyanate component described above, so that a foaming reaction occurs in the mixture. Described in detail, the resin premix and the organic polyisocyanate component are mixed together by a known urethane foaming machine, with a proportion that permits the NCO/OH index to be held within a range of 0.6–1.2. The mixture is introduced in a suitable mold, so that a foaming reaction takes place within the mold, to form the desired polyurethane foam.

If the NCO/OH index in the foaming reaction between the organic polyisocyanate component and the polyol component were smaller than 0.6, the properties of the formed foam would be deteriorated, with the foam suffering from a permanent strain, for example. If the NCO/OH index were larger than 1.2, the mixture undergoes an excessive cross-linking, also resulting in deterioration of the properties of the foam, such as a low degree of flame resistance, insufficient curing and a low degree of formability.

The soft polyurethane foam thus manufactured can be suitably used as a flame-resistant and sound- and vibration-insulating member according to the present invention, for example, as an engine cover, a side cover, an oil pan cover, an under cover, a hood silencer, and a dashboard silencer, which are disposed around or in the vicinity of an engine of an automotive vehicle, to reduce the amount of sound or noise to be transmitted from the engine. In particular, the soft polyurethane foam may be suitably used as spacers or fillers for filling gaps or spaces between the engine and the surrounding devices, for attenuating the standing waves.

EXAMPLES

To further clarify the present invention, there will be described some examples of the present invention. It is to be understood, however, that the present invention is not limited to the details of the following examples and the preferred embodiments described above, and that the present invention may be embodied with various changes, modifications and improvements, which may occur to those skilled in the art without departing from the spirit of the present invention.

Initially, diethylene glycol as the cross-linking agent, water as the foaming agent, amine catalyst A (tertiary amine catalyst available from KaO Corporation, Japan), amine catalyst B (triethyl amine) and silicone-based foaming stabilizer (available from Nippon Unicar Co. Ltd., Japan) were added to 100 parts by weight of polyeter polyol (available from Sumika Bayer Urethane Co., Ltd., Japan; average molecular weight=6000; number of functional groups=3; OH value=28mgKOH/g), in a proportion indicated in TABLE 1, to obtain two samples of premix polyol, that is, premix polyol sample A and premix polyol sample B also indicated in TABLE 1.

TABLE 1

|  |  | Premix Polyol | |
| --- | --- | --- | --- |
|  |  | A | B |
| Contents (parts by weight) | Polyether Polyol | 100 | 100 |
|  | Diethylene glycol | 2 | 2 |
|  | Water | 2.5 | 4.2 |
|  | Amine Catalyst A | 0.5 | 0.3 |
|  | Amine Catalyst B | 0.6 | 0.6 |
|  | Amine Catalyst C | — | 0.8 |
|  | Silicone-based foaming stabilizer | 0.5 | 1 |

On the other hand, samples (a)–(g) of polyisocyanate having respective compositions indicated in TABLE 2 were prepared as the organic polyisocyanate component. Described in detail, samples of monomeric MDI (M-MDI) corresponding to these polyisocyanate samples (a)–(g) were prepared by adding a mixture of 4, 4'-MDI and 2, 4'-MDI (whose compositions were known) to carbodiimide and uretone imine products obtained by carbodiimidization and uretone-iminization reactions of 4, 4'-MDI in a known manner. The proportions of the mixture of 4, 4'-MDI and 2, 4'-MDI and the carbodiimide and uretone imine products in the M-MDI samples were determined to establish respective predetermined NCO % values indicated in TABLE 2. To the thus prepared M-MDI samples, there was added tolylene diisocyanate (TDI) in respective proportions, so as to establish respective predetermined total NCO % values of the polyisocyanate samples (a)–(g) also indicated in TABLE 2. Thus, the polyisocyanate samples (a)–(g) were prepared.

TABLE 2

| | Polyisocyanate Composition | | | | | | Total |
|---|---|---|---|---|---|---|---|
| | M-MDI | | | | | | |
| Samples of Polyisocyanate | Modifications* (parts by weight) | 4,4'-MDI (parts by weight) | 2,4'-MDI (parts by weight) | M-MDI NCO % | Total MDI (parts by weight) | TDI (parts by weight) | Total NCO % | Amount (parts by weight) |

| Samples of Polyisocyanate | Modifications* (parts by weight) | 4,4'-MDI (parts by weight) | 2,4'-MDI (parts by weight) | M-MDI NCO % | Total MDI (parts by weight) | TDI (parts by weight) | Total NCO % | Amount (parts by weight) |
|---|---|---|---|---|---|---|---|---|
| a | 28.0 | 71.0 | 1.0  | 29.0 | 100.0 | 0    | 29.0 | 100.0 |
| b | 8.8  | 61.2 | 30.0 | 32.0 | 100.0 | 0    | 32.0 | 100.0 |
| c | 3.6  | 51.4 | 45.0 | 33.0 | 100.0 | 0    | 33.0 | 100.0 |
| d | 14.0 | 73.5 | 12.5 | 31.3 | 100.0 | 25.0 | 34.7 | 125.0 |
| e | 16.0 | 82.6 | 1.4  | 30.9 | 100.0 | 42.9 | 36.1 | 142.9 |
| f | 31.0 | 63.0 | 6.0  | 28.5 | 100.0 | 0    | 28.5 | 100.0 |
| g | 0.0  | 50.0 | 40.0 | 33.6 | 100.0 | 0    | 33.6 | 100.0 |

*Modifications = carbodiimide product + uretone imine product

The thus prepared premix polyol sample A or B and one of the prepared polyisocyanate samples (a)–(g) were mixed together, in proportions indicated in TABLE 3 and so as to establish NCO/OH index values also indicated in TABLE 3. The thus obtained mixtures kept at 22° C. were introduced in a suitable mold (made of a metal) kept at 52° C., for a foaming reaction, and cured for five minutes, so that polyurethane foam Nos. 1–7 each having dimensions of 308 mm×308 mm×51 mm indicated in TABLE 3.

TABLE 3

| Polyurethane Foam No. | Premix polyol | | Polyisocyante | | NCO/OH Index |
|---|---|---|---|---|---|
| | Sample | Parts by weight | Sample | Parts by weight | |
| 1 | A | 100 | a | 48.9 | 95 |
| 2 | A | 100 | b | 44.3 | 95 |
| 3 | A | 100 | c | 42.9 | 95 |
| 4 | B | 100 | d | 60.7 | 90 |
| 5 | B | 100 | e | 54.6 | 90 |
| 6 | A | 100 | f | 49.7 | 95 |
| 7 | A | 100 | g | 42.2 | 95 |

The thus prepared polyurethane foam Nos. 1–7 were evaluated of their formability, and measured of their density values, 50% compressive load values and sound absorption properties. Results of the evaluation and measurement of the foam Nos. 1–7 are indicated in TABLE 4. The 50% compressive load values were measured in accordance with ASTM-D-3574, and the sound absorption properties were measured in accordance with JIS-A-1405. It will be understood from TABLE 4 that all of the polyurethane foam Nos. 1–7 exhibited good sound absorption properties. More specifically described, the measurement confirmed sound absorption ratios of 0.6 or higher at 1000 Hz, 0.9 or higher at 1500 Hz, and 0.8 or higher at 2000 Hz. The polyurethane foam No. 7 exhibited poor formability, with expansion or shrinkage upon removal of the foam from the mold, and had a poor surface condition.

TABLE 4

| Polyurethane Foam No. | Density (kg/m$^3$) | 50% Compressive Load ($\times 10^{-2}$ N/mm$^2$) | Formability | Sound Absorption Property |
|---|---|---|---|---|
| 1 | 101 | 23–50 | Good | Good |
| 2 | 102 | 8–18  | Good | Good |
| 3 | 101 | 6–8   | Good | Good |
| 4 | 50  | 18–25 | Excellent | Good |
| 5 | 50  | 15–23 | Excellent | Good |
| 6 | 101 | 23–35 | Excellent | Good |
| 7 | 100 | 6–8   | Poor | Good |

The polyurethane foam Nos. 1–7 were also evaluated of their inflammability or flame resistance, by conducting a flammability test according to FMVSS-302, and also measured of their tensile strength and elongation values. Results of the evaluation and measurement are indicated as "Initial Properties in TABLE 5. Then, the polyurethane foam Nos. 1–7 were subjected to a heat aging or deterioration test for 50 hours at 160° C. Subsequently, the foam Nos. 1–7 were evaluated of their flammability and measured of their tensile strength and elongation values. Results of these second evaluation and measurement are indicated as "Post Heat-Test Properties" in TABLE 5. This table also indicates "post/initial percent" values of the tensile strength and elongation of the polyurethane foam Nos. 1–7, which are the post heat-test values after the heat deterioration test divided by the initial values before the test. In the flammability test according to FMVSS-302, the specimen of each foam was kept in its horizontally extending attitude, and was exposed at one end thereof to a flame of a burner for 10 seconds. The evaluation of the flammability or flame resistance was made by checking if a fire was absent on the specimen or extinguished immediately after the flame was removed from the specimen. If an affirmative result was confirmed by the checking, the specimen was evaluated to be flame resistant (NB: non-burn) as indicated in TABLE 5.

TABLE 5

| Polyurethane Foam No. | Initial Properties | | | Post Heat-Test Properties | | | Post/Initial (%) | |
|---|---|---|---|---|---|---|---|---|
| | FMVSS302 Flammability (mm/min) | Tensile Strength (KPa) | Elongation (%) | FMVSS302 Flammability (mm/min) | Tensile Strength (KPa) | Elongation (%) | Tensile Strength (KPa) | Elongation (%) |
| 1 | NB | 281 | 142 | NB | 197 | 152 | 70 | 107 |
| 2 | NB | 265 | 193 | NB | 181 | 225 | 68 | 117 |
| 3 | NB | 276 | 243 | NB | 204 | 295 | 74 | 121 |
| 4 | NB | 268 | 91 | NB | 205 | 120 | 76 | 132 |
| 5 | NB | 216 | 88 | NB | 195 | 124 | 90 | 141 |
| 6 | 28.2 | 290 | 141 | 21.3 | 201 | 136 | 69 | 96 |
| 7 | NB | 284 | 257 | NB | 228 | 347 | 80 | 135 |

It will be understood from TABLES 4 and 5 that the polyurethane foam Nos. 1–5 exhibited high degrees of flame resistance and heat deterioration resistance. Each of these foam Nos. 1–5 used the organic polyisocyanate component including as a major component thereof the monomeric MDI which includes MDI and carbodiimide and uretone imine products of MDI and which contains 29–33% of NCO and 1–45% by weight of 2, 4'-MDI. Each of those foam Nos. 1–5 also used the polyol component which includes at least 50% by weight of polyol having 2–8 functional groups and a molecular weight of 1000–10000. It will be understood that the polyurethane foam Nos. 1–5 may be suitably used as a flame-resistant and sound- and vibration-insulating member for a vehicle.

On the other hand, the polyurethane foam No. 6 formed by using the monomeric MDI whose NCO content is smaller than 29% suffered from a low degree of flame resistance in the flammability test according to FMVSS-302, and thus did not exhibit a sufficiently high degree of flame resistance. Further, the polyurethane foam No. 7 formed by using the monomeric MDI not including at least one of the carbodiimide and uretone imine products exhibited extremely poor formability, as indicated in TABLE 4, and therefore suffered from problems of low efficiency of manufacture and quality.

As apparent from the foregoing explanation, the present invention provides a material which is excellent in not only the flame resistance but also the heat deterioration resistance, and which has excellent sound absorbing or insulating properties and excellent vibration insulating properties. The present material is further characterized in that it is available at an effectively reduced cost, without any conventionally used flame retardant contained therein. Thus, the present invention provides an improved flame-resistant and sound- and vibration-insulating member for a vehicle.

What is claimed is:

1. A flame-resistant and sound- and vibration-insulating member for a vehicle, comprising a soft polyurethane foam formed by a reaction between an organic polyisocyanate component and a polyol component, wherein an improvement comprises:

said organic polyisocyanate component including as a major component thereof a monomeric MDI which includes diphenylmethane diisocyanate and further includes a reaction product of carbodiimide and/or uretone imine groups, said reaction product being obtained by carbodiimidizing isocyanate groups of diphenylmethane diisocyanate, said monomeric MDI containing 29–33% of NCO and including 1–45% by weight of 2, 4'-diphenylmethane diisocyanate in the form of a monomer and/or a carbodiimidization product thereof; and said polyol component including at least 50% by weight of polyol having 2–8 functional groups and a molecular weight of 1000–10000, wherein said organic polyisocyanate component does not include a polymeric MDI consisting of a crude MDI having at least three benzene rings in a molecule, or includes the polymeric MDI such that a content of said polymeric MDI with respect to a sum of said monomeric MDI and said polymeric MDI is not larger than 5% by weight, and wherein said soft polyurethane foam has a density of 40–150 kg/m$^3$, a 50% compressive load of $(5-60)\times10^{-2}$ N/mm$^2$, a tensile strength of at least 120 kPa and an elongation of at least 50%, and exhibits flame resistance under a flammability test according to FMVSS-302 (Federal Motor Vehicle Safety Standards. USA).

2. A process of manufacturing a flame-resistant and sound- and vibration-insulating member for a vehicle, comprising a soft polyurethane foam formed by a reaction between an organic polyisocyanate component and a polyol component, said process comprising the steps of:

preparing said organic polyisocyanate component such that said organic polyisocyanate component includes as a major component thereof diphenylmethane diisocyanate and further includes a reaction product containing carbodiimide and/or uretone imine groups, said reaction product being obtained by carbodiimidizing isocyanate groups of diphenylmethane diisocyanate, said monomeric MDI containing 29–33% of NCO and including MDI including 1–45% by weight of 2,4'-diphenylmethane diisocyanate in the form of a monomer and/or a carbodiimidization product thereof, wherein said organic polyisocyanate component does not include a polymeric MDI consisting of a crude MDI having at least three benzene rings in a molecule, or includes the polymeric MDI such that a content of said polymeric MDI with respect to a sum of said monomeric MDI and said polymeric MDI is not larger than 5% by weight;

preparing said polyol component such that said polyol component includes at least 50% by weight of polyol having 2–8 functional groups and a molecular weight of 1000–10000; and causing a reaction between said organic polyisocyanate component and said polyol component, to form said soft polyurethane foam, such that a NCO/OH index is held within a range of 0.6–1.2, and wherein said soft polyurethane foam has a density of 40–150 kg/M$^3$, a 50% compressive load of $(5-60) \times 10^{-2}$ N/mm$^2$, a tensile strength of at least 120 kPa and an elongation of at least 50%, and exhibits flame resistance under a flammability test according to FMVSS-302 (Federal Motor Vehicle Safety Standards, USA).

3. A flame-resistant and sound- and vibration-insulating member according to claim 1, wherein a content of NCO in said monomeric MDI is held within a range of 30.5–32.5%.

4. A flame-resistant and sound- and vibration-insulating member according to claim 1, wherein each of said tensile strength and said elongation of said soft polyurethane foam after a heat deterioration test for 50 hours at 160° C. is at least 50% of those before said heat deterioration test.

5. A process according to claim 2, wherein said reaction between said polyisocyanate component and said polyol component takes place in the presence of a foaming agent.

6. A flame-resistant and sound-and-vibration-insulating member according to claim 1, wherein said soft polyurethane foam exhibits flame resistance in the absence of a flame retardant.

7. A process according to claim 2, wherein said soft polyurethane foam exhibits flame resistance in absence of a flame retardant.

* * * * *

UNITED STATES PATENT AND TRADEMARK OFFICE
CERTIFICATE OF CORRECTION

PATENT NO.   : 6,765,034 B2
DATED        : July 20, 2004
INVENTOR(S)  : Kiyomi Nishida et al.

It is certified that error appears in the above-identified patent and that said Letters Patent is hereby corrected as shown below:

<u>Title page,</u>
Item [*] Notice, please change "U.S.C. 154(b) by 0 days." to -- U.S.C. 154(b) by 13 days. --

Signed and Sealed this

Twenty-third Day of November, 2004

JON W. DUDAS
*Director of the United States Patent and Trademark Office*